(12) United States Patent
Sakamoto et al.

(10) Patent No.: US 11,892,359 B2
(45) Date of Patent: Feb. 6, 2024

(54) INSTALLATION STRUCTURE OF TEMPERATURE SENSOR AND TEMPERATURE SENSOR

(71) Applicant: Yazaki Corporation, Tokyo (JP)

(72) Inventors: Akinori Sakamoto, Shizuoka (JP); Kenta Tanaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 206 days.

(21) Appl. No.: 17/495,182

(22) Filed: Oct. 6, 2021

(65) Prior Publication Data

US 2022/0113196 A1    Apr. 14, 2022

(30) Foreign Application Priority Data

Oct. 9, 2020  (JP) ................................ 2020-171060

(51) Int. Cl.
  *G01K 1/14*  (2021.01)
  *G01K 1/08*  (2021.01)
  *G01K 7/22*  (2006.01)

(52) U.S. Cl.
  CPC ............... *G01K 1/14* (2013.01); *G01K 1/08* (2013.01); *G01K 7/22* (2013.01)

(58) Field of Classification Search
  CPC .............. G01K 1/14; G01K 1/08; G01K 7/22
  USPC ........................................................ 374/208
  See application file for complete search history.

(56) References Cited

U.S. PATENT DOCUMENTS

| | | | |
|---|---|---|---|
| 2013/0182745 | A1 | 7/2013 | Hertel et al. |
| 2013/0224542 | A1* | 8/2013 | Kim ................. H01M 10/6561 |
| | | | 429/90 |
| 2017/0194771 | A1 | 7/2017 | Aoki |
| 2019/0178724 | A1* | 6/2019 | Yanagida ................. G01K 1/14 |
| 2020/0249097 | A1* | 8/2020 | Ogura ....................... G01K 7/22 |

FOREIGN PATENT DOCUMENTS

| | | | |
|---|---|---|---|
| CN | 107144365 A | * | 9/2017 |
| DE | 102020107862 A1 | * | 9/2021 |
| JP | 2011-017638 A | | 1/2011 |
| JP | 4712929 B2 | * | 6/2011 |
| JP | 2015099087 A | | 5/2015 |
| JP | WO2019087755 A1 | | 5/2019 |
| KR | 20200015246 A | * | 2/2020 |

* cited by examiner

*Primary Examiner* — Mirellys Jagan
(74) *Attorney, Agent, or Firm* — Sughrue Mion, PLLC (57) ABSTRACT

An installation structure of a temperature sensor includes a measured object support provided with an installation section, a guide section, and a measured object support section configured to support a measured object; and a temperature sensor provided with a guided section engaged with the guide section of the measured object support, and installed in the installation section of the measured object support by moving in a predetermined direction relative to the measured object support in a manner along one predetermined outer surface of the measured object while engaging the guided section with the guide section.

3 Claims, 8 Drawing Sheets

INSTALLATION STRUCTURE OF TEMPERATURE SENSOR AND TEMPERATURE SENSOR

CROSS REFERENCE TO RELATED APPLICATION

This application is based on, and claims priority from the prior Japanese Patent Application No. 2020-171060 filed on Oct. 9, 2020, the entire contents of which are incorporated herein by reference.

TECHNICAL FIELD

The disclosure relates to an installation structure of a temperature sensor, and the temperature sensor.

BACKGROUND

For the purpose of detecting a temperature of a heat source such as a battery (battery cell), JP 2011-17638 A discloses a temperature sensor installed on the top or the side of the battery. This temperature sensor employs a fitting technique by a spring structure (arm section).

SUMMARY

However, in the installation structure of the temperature sensor, a space required for installing the temperature sensor is large, so that there are fewer options for a mounting position (installation mode) of the temperature sensor.

An object of the disclosure is to provide an installation structure of a temperature sensor capable of increasing a degree of freedom of an installation mode of the temperature sensor, and the temperature sensor.

An installation structure of a temperature sensor according to the present embodiment includes a measured object support provided with an installation section, a guide section, and a measured object support section configured to support a measured object; and a temperature sensor provided with a guided section engaged with the guide section of the measured object support, and installed in the installation section of the measured object support by moving in a predetermined direction relative to the measured object support in a manner along one predetermined outer surface of the measured object while engaging the guided section with the guide section.

The installation structure of the temperature sensor according to the present embodiment may be configured such that the measured object support is provided with a locking section, the temperature sensor is provided with a locked section, and in order to install the temperature sensor in the installation section of the measured object support, when the temperature sensor is moved to relative to the measured object support in a predetermined direction, the locked section is separated from the locking section in a first stage and a middle stage of the movement, and when the movement is completed, the locked section is locked to the locking section, so that the temperature sensor is installed in the measured object support.

The installation structure of the temperature sensor according to the present embodiment may be configured such that the plurality of measured objects are provided, and the temperature sensor which is installed between the two measured objects, adjacent to each other, among the plurality of measured objects installed in the measured object support is configured to measure temperatures of the two measured objects adjacent to each other.

The installation structure of the temperature sensor according to the present embodiment may be configured such that the temperature sensor includes a temperature sensor housing having a planar outer surface; a lead wire in which a first end portion, which is one end in a longitudinal direction, enters the temperature sensor housing, and in the first end portion, a pair of core wires extends in parallel with the planar outer surface of the temperature sensor housing; a temperature detection element installed in the temperature sensor housing away from the first end of the lead wire; and a pair of connection conductors formed into an elongated rod shape extends in the temperature sensor housing in the same direction as the pair of core wires of the lead wire, and connects each of the pair of core wires of the lead wire to the temperature detection element, and the temperature sensor may be configured such that the pair of core wires in the first end portion of the lead wire, the pair of connection conductors, and the temperature detection element are arranged along the planar outer surface of the temperature sensor housing in a vicinity of the planar outer surface of the temperature sensor housing.

A temperature sensor according to the present embodiment includes a temperature sensor housing having a planar outer surface; a lead wire in which a first end portion, which is one end in a longitudinal direction, enters the temperature sensor housing, and in the first end portion, a pair of core wires extends in parallel with the planar outer surface of the temperature sensor housing; a temperature detection element installed in the temperature sensor housing away from the first end of the lead wire; and a pair of connection conductors formed into an elongated rod shape extends in the temperature sensor housing in the same direction as the pair of core wires of the lead wire, and connects each of the pair of core wires of the lead wire to the temperature detection element, and the temperature sensor is configured such that the pair of core wires in the first end portion of the lead wire, the pair of connection conductors, and the temperature detection element are arranged along the planar outer surface of the temperature sensor housing in a vicinity of the planar outer surface of the temperature sensor housing.

The temperature sensor according to the present embodiment may be configured such that a center axis of the pair of core wires in the first end portion of the lead wire and a center axis of the connection conductor pass through a center of the temperature detection element when seen in a direction indicating a distance between the pair of connection conductors.

The above structure makes it possible to provide an installation structure of a temperature sensor capable of increasing a degree of freedom of an installation mode of the temperature sensor, and the temperature sensor.

DETAILED DESCRIPTION

In an installation structure of a temperature sensor 1 according to the present embodiment, a temperature sensor (thermistor) 3 detects (measures) a temperature of a measured object (e.g., battery cell) 5 that is a heat source. As shown in FIGS. 1 to 4B, the installation structure of the temperature sensor 1 includes a temperature sensor 3 and a measured object support (for example, a battery cell support) 7.

For convenience of explanation, a predetermined direction is defined as a vertical direction, a predetermined direction orthogonal to the vertical direction is defined as a lateral direction, and a direction orthogonal to the vertical direction and the lateral direction is defined as an up-and-down direction. Since these directions are defined for convenience of explanation, the up-and-down direction does not necessarily have to coincide with the direction of gravity.

Figure 1:
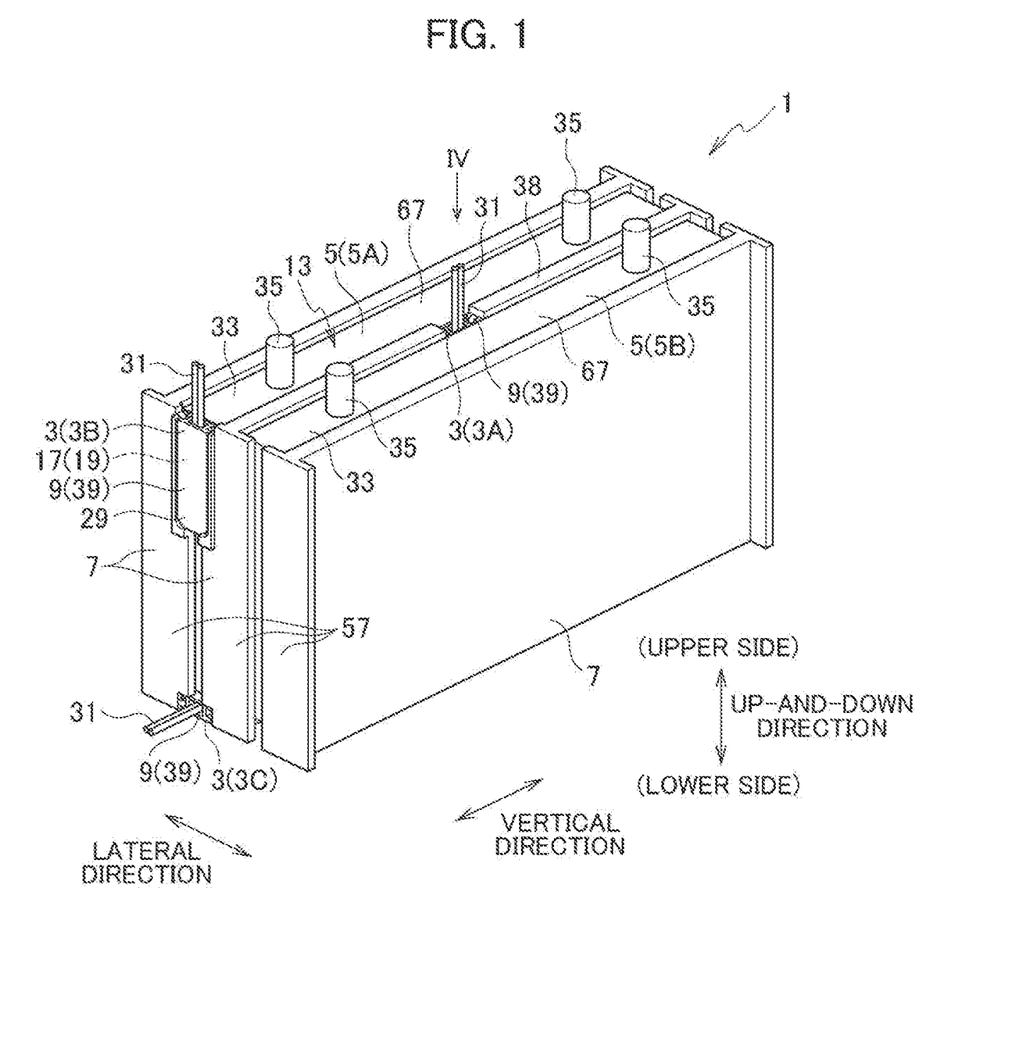
FIG. 1 is a perspective view showing an installation structure of a temperature sensor according to the present embodiment.

Although three temperature sensors 3A, 3B, and 3C are shown in FIG. 1 and the like, the directions shown in FIGS. 4A to 9D are based on the temperature sensor 3A shown in FIG. 1.

The battery cell support 7 is provided with an installation section (temperature sensor installation section) 9, a guide section (temperature sensor guide) 11, and a measured object support section (battery cell installation section) 13. The battery cell installation section 13 supports the battery cell 5. That is, the battery cell 5 is installed in the battery cell installation section 13.

The temperature sensor 3 includes a guided section (temperature sensor guided section) 15 engaged with the guide section 11 of the battery cell support 7. The temperature sensor 3 is installed in the battery cell installation section 13 of the battery cell support 7 by moving relative to the battery cell support 7 while engaging the guided section 15 with the guide section 11. After the installation, the temperature sensor 3 detects a temperature of the battery cell 5.

The temperature sensor 3 is installed in the battery cell support 7 by linearly moving the temperature sensor 3 by a predetermined distance relative to the battery cell support 7 in a manner along the battery cell 5.

More specifically, in the installation structure of the temperature sensor 1, a moving direction of the temperature sensor 3 relative to the battery cell support 7 and the battery cell 5 when the temperature sensor 3 is installed in the battery cell support 7 is a predetermined direction shown below. That is, the predetermined direction is a direction parallel to or a direction slightly inclined from one predetermined plane (planar outer surface) 17 of the battery cell 5.

For example, assume a state that the battery cell 5 is installed in the battery cell support 7, the temperature sensor 3 is in a state before being installed in the battery cell support 7, and that the guided section 15 of the temperature sensor 3 is engaged with the guide section 11 of the battery cell support 7. In this state, the temperature sensor 3 moves linearly by a predetermined distance in a direction parallel to one plane 17 of the battery cell 5. By moving in this way, the temperature sensor 3 is installed in the battery cell support 7.

The temperature sensor 3 does not necessarily have to be installed in the battery cell support 7 in a state that the battery cell 5 is installed in the battery cell support 7. The temperature sensor 3 may be installed in the battery cell support 7 in a state that the battery cell 5 is not installed in the battery cell support 7. Thereafter, the battery cell 5 may be installed in the battery cell support 7.

That is, regardless of the order in which the temperature sensor 3 and the battery cell 5 are installed in the battery cell support 7, after the temperature sensor 3 and the battery cell 5 are installed, it is enough as long as a moving direction of the temperature sensor 3 is regarded as the above predetermined direction. As described above, the predetermined direction is a direction parallel to or a direction slightly inclined from the one predetermined plane 17 of the battery cell 5.

Thus, the temperature sensor 3 is installed in the battery cell support 7 by moving the temperature sensor 3 relative to the battery cell support 7 in a manner along the outer surface (surface) 17 of the battery cell 5.

Here, the installation structure of the temperature sensor 1 in which the battery cell 5 and the temperature sensor 3 are installed in the battery cell support 7 is referred to as "an installation structure of an installed temperature sensor". In the installation structure of the installed temperature sensor 1, as shown in FIG. 4A or the like, one plane 17 of the battery cell 5 and one predetermined planar outer surface (plane) 19 of the temperature sensor 3 are parallel to each other.

Figure 4A:
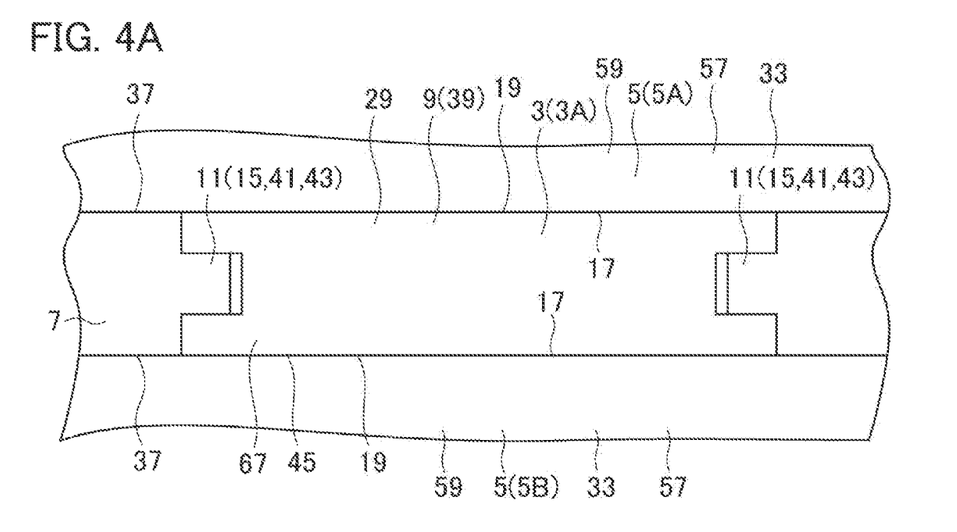
FIG. 4A is a diagram of the temperature sensor and a periphery of the temperature sensor seen from the direction IV in FIG. 1.
Figure 4B:
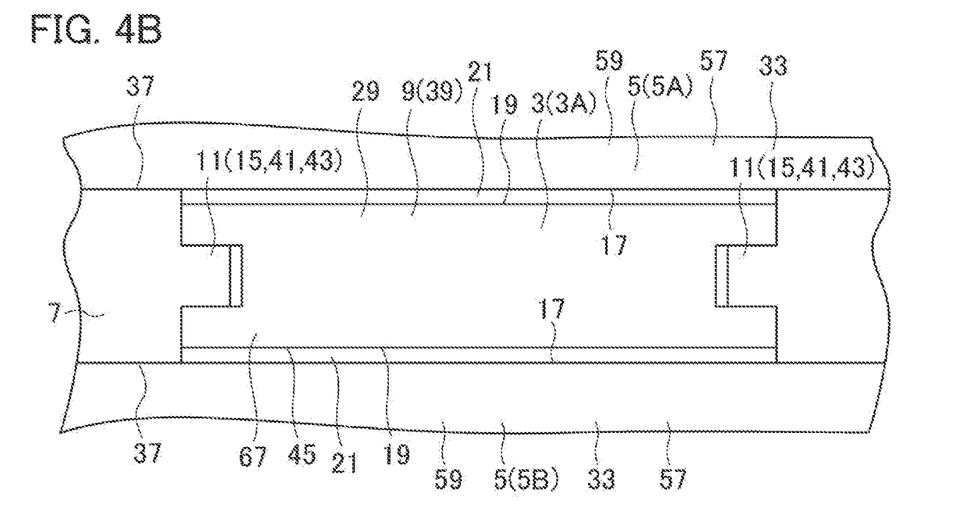
FIG. 4B shows another aspect of FIG. 4A.

In the installation structure of the installed temperature sensor 1, the two planes 17 and 19 are slightly apart from each other (see FIG. 4B). However, a thermally conductive material 21 is filled between the two planes 17 and 19. This does not inhibit a heat conduction from the battery cell 5 to the temperature sensor 3, thereby performing heat conduction in a good state. The material 21 having a thermal conductivity may be, for example, a synthetic resin (heat-conductive adhesive, double-sided tape, etc.) having a good thermal conductivity in a range of 1 W/m·K to 20 W/m·K. In addition, a metal or the like may be used as the material 21 having a thermal conductivity.

In the installation structure of the installed temperature sensor 1, the one predetermined plane 17 of the battery cell 5 and the one predetermined plane 19 of the temperature sensor 3 may be in contact with each other with an energizing force (see FIG. 4A). In this case, the material 21 having a thermal conductivity may not be provided.

In the installation structure of the temperature sensor 1, the one predetermined plane 19 of the temperature sensor 3 that is parallel to the one predetermined plane 17 of the battery cell 5 has desirably the following plane. That is, it is desirable that the plane has the best responsiveness and the highest sensitivity with respect to a temperature sensed by the temperature sensor 3. As such a plane, a plane having the widest area among a plurality of planes constituting the outer surface of the temperature sensor 3 and in which a temperature detection element (thermistor element) 23 shown in FIG. 8 or the like is positioned nearby is used.

Figure 5:
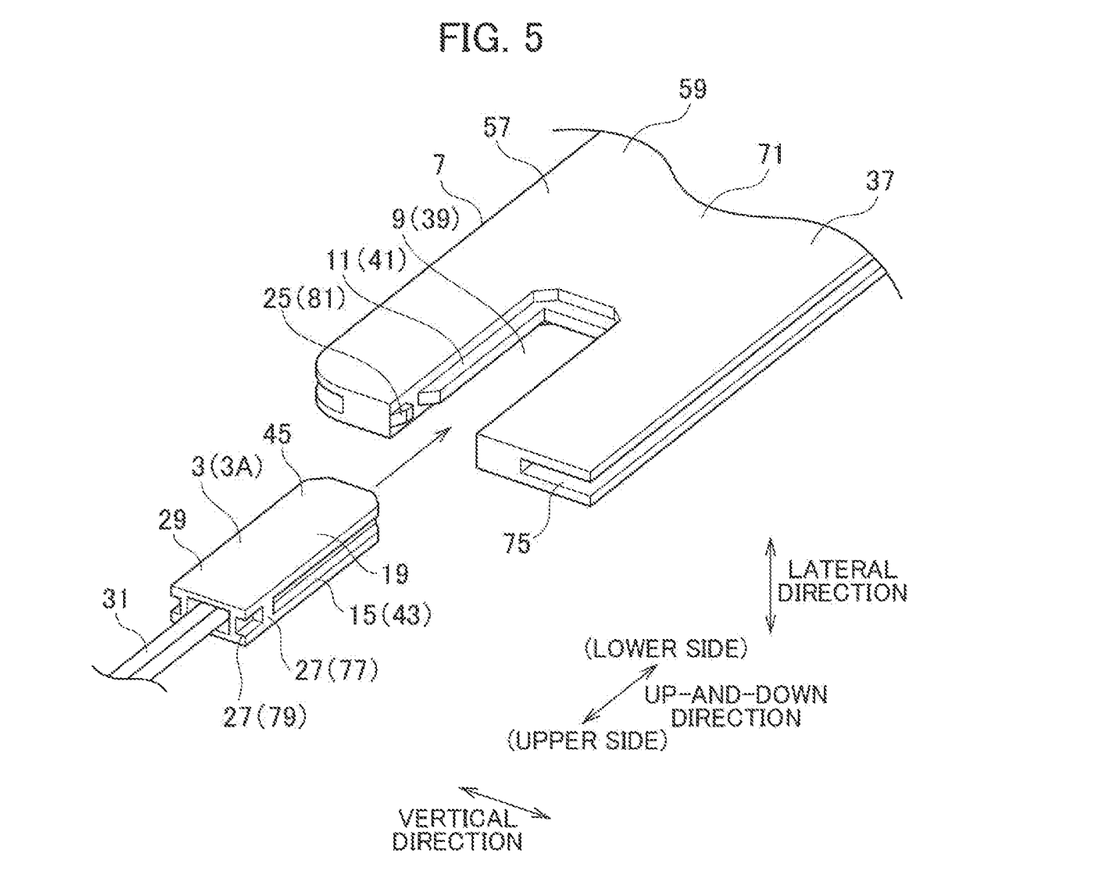
FIG. 5 is a perspective view showing a state before the temperature sensor is installed in a measured object support in the installation structure of the temperature sensor according to the present embodiment.
Figure 6A:
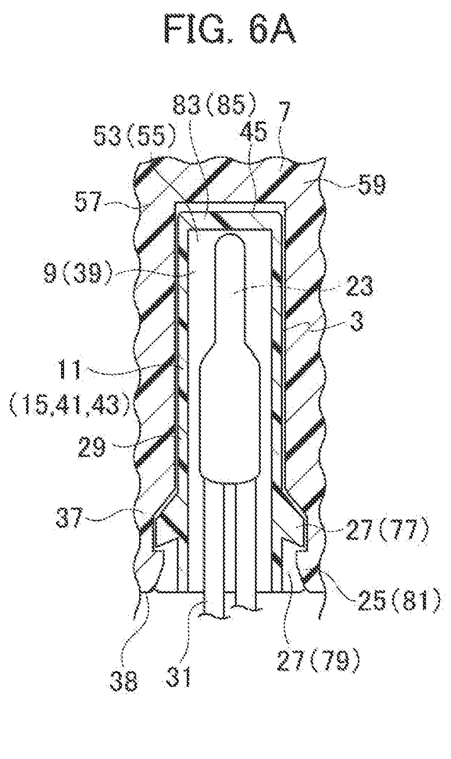
FIG. 6A is a sectional view showing a state in which the temperature sensor is installed in the measured object support in the installation structure of the temperature sensor according to the present embodiment (sectional view in a plane orthogonal to the vertical direction).

As shown in FIGS. 5 and 6A, a locking section 25 is provided on the upper side in the up-and-down direction of the battery cell support 7, and a locked section 27 is provided on the upper side in the up-and-down direction of the temperature sensor 3.

Figure 6B:
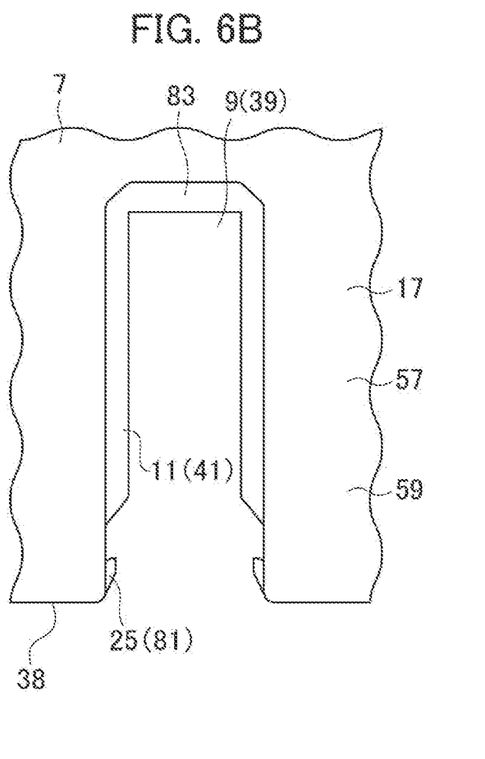
FIG. 6B is a diagram in which the temperature sensor is removed from the sectional view in FIG. 6A.

In order to install the temperature sensor 3 in the temperature sensor installation section 9 of the battery cell support 7, firstly, the guided section 15 is engaged with the guide section 11 in a state where the temperature sensor 3 is separated from the battery cell support 7 (see FIG. 6B).

With this engagement, the temperature sensor 3 is moved relative to the battery cell support 7 (see an arrow in FIG. 5). In the first stage and the middle stage of the movement, the locked section 27 is separated from the locking section 25.

In the final stage of the movement, the locked section 27 is engaged with the locking section 25. When the movement is completed, the locked section 27 is locked to the locking section 25. Thus, the temperature sensor 3 is integrally installed in the battery cell support 7.

The temperature sensor 3 includes a rectangular parallelepiped temperature sensor body 29 and a lead wire 31 extending from the temperature sensor body 29. The battery cell 5 includes a rectangular parallelepiped battery cell body 33 and battery cell terminals 35 protruding from the battery cell body 33.

In the installation structure of the installed temperature sensor 1, as shown in FIG. 4B and the like, one plane 19 having a large area of the rectangular parallelepiped temperature sensor body 29 is parallel to one plane 17 of the battery cell body 33 with a slight gap. The temperature sensor 3 measures a temperature of the battery cell body 33.

As can be understood from FIG. 5 and the like, in the temperature sensor body 29, an area of the outer surface of rectangular shape orthogonal to the lateral direction is the largest. Next, an area of the outer surface of rectangular shape orthogonal to the vertical direction is the second largest.

Figure 2:
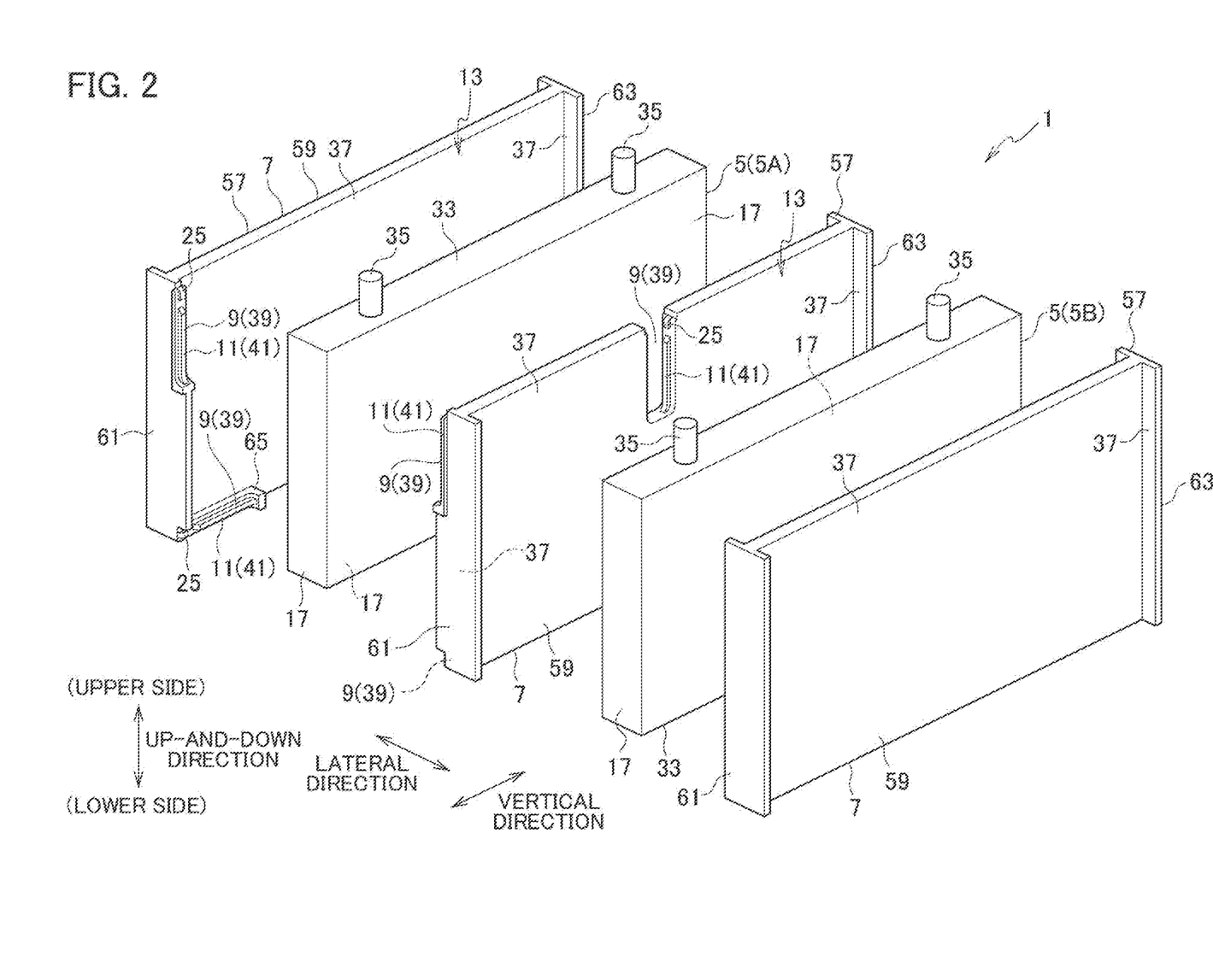
FIG. 2 is an exploded perspective view showing the installation structure of the temperature sensor (the installation structure of the temperature sensor excluding the temperature sensor) according to the present embodiment.

The battery cell support 7 includes a flat portion 37. In the installation structure of the installed temperature sensor 1, as shown in FIG. 2 or the like, a thickness direction of the flat portion 37 of the battery cell support 7 is perpendicular to one plane 17 of the battery cell body 33.

As shown in FIGS. 5 and 6A, the temperature sensor installation section 9 is formed by a rectangular parallelepiped concave portion (notch) 39 formed in the flat portion 37 of the battery cell support 7. The concave portion 39 constituting the temperature sensor installation section 9 penetrates the flat portion 37 of the battery cell support 7 in the thickness direction. When seen in the thickness direction of the flat portion 37 of the battery cell support 7, the concave portion 39 constituting the temperature sensor installation section 9 is formed into a rectangular shape.

Figure 3:
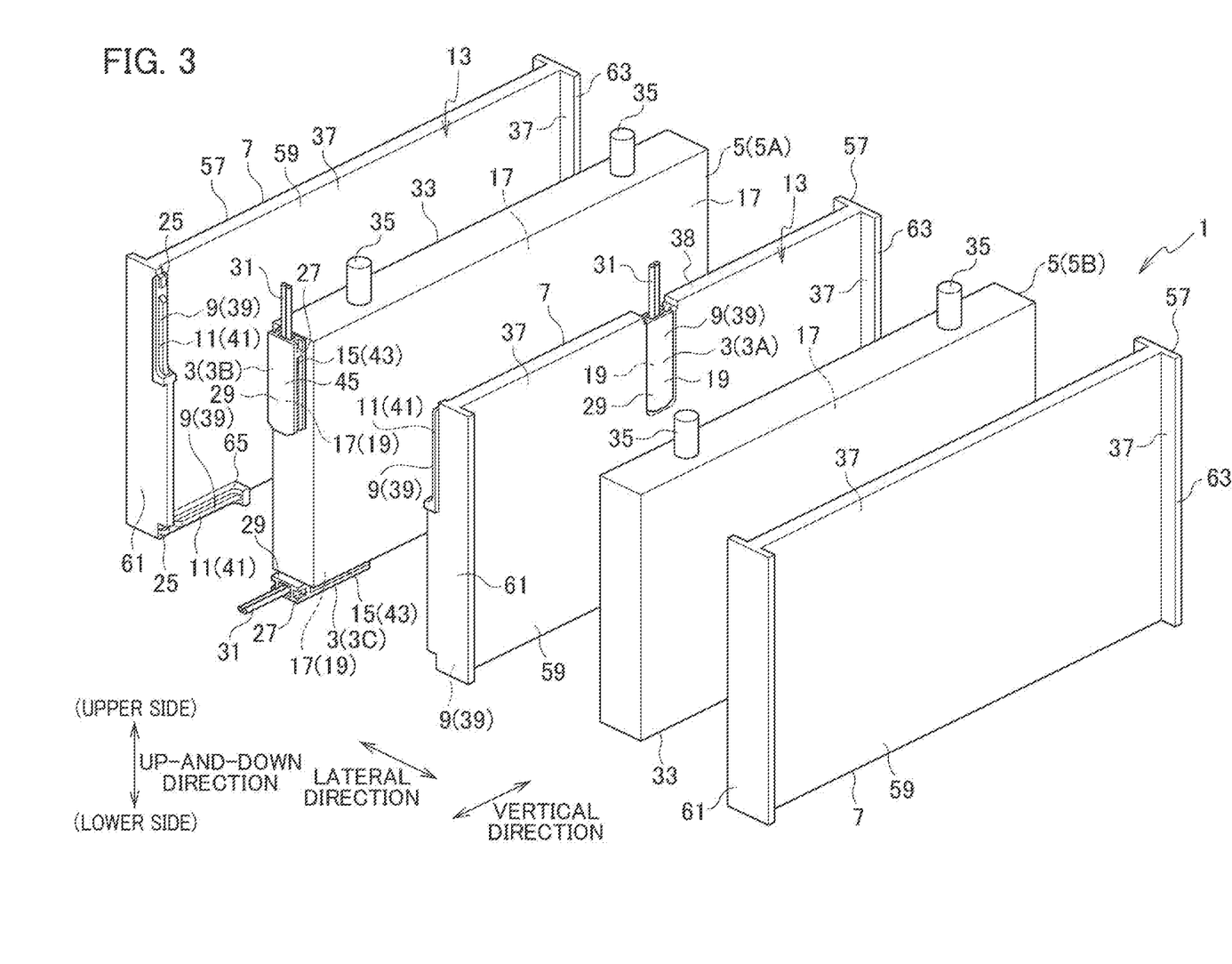
FIG. 3 is an exploded perspective view showing the installation structure of the temperature sensor according to the present embodiment.
Figure 7:
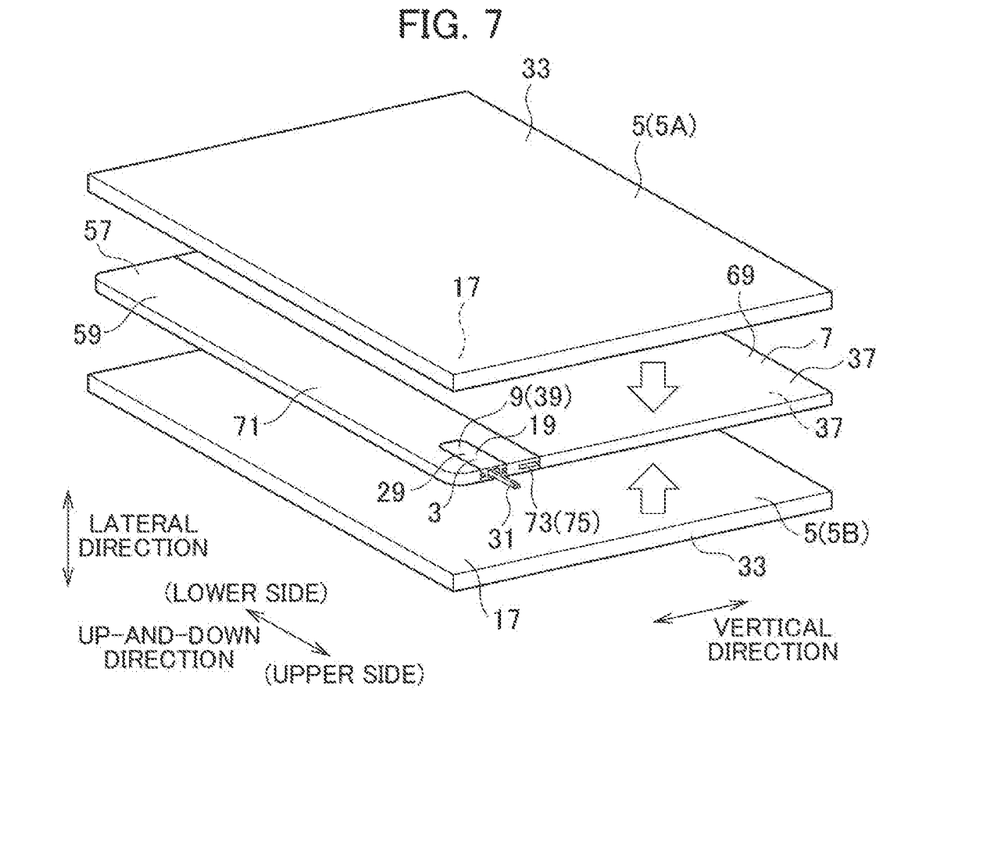
FIG. 7 is a perspective view showing an aspect that the measured object support and a battery cell are stacked in the installation structure of the temperature sensor according to the present embodiment.

In the installation structure of the installed temperature sensor 1, as shown in FIGS. 3, 6A, and 7, the temperature sensor body 29 is configured so as to be completely buried in the concave portion 39 constituting the temperature sensor installation section 9. Further, when seen in the thickness direction of the flat portion 37 of the battery cell support 7, the lead wire 31 of the temperature sensor 3 extends from an end face (an end face of the temperature sensor body 29) 38 of the flat portion 37 of the battery cell support 7 in the installation structure of the installed temperature sensor 1.

A moving direction of the temperature sensor 3 relative to the battery cell support 7 when the temperature sensor 3 is installed in the battery cell support 7 is a depth direction of the concave portion 39 constituting the temperature sensor installation section 9. The depth direction of the concave portion 39 is in the up-and-down direction in FIG. 6A, and is perpendicular to the thickness direction of the flat portion 37 of the battery cell support 7, and is also perpendicular to the end face 38 of the flat portion 37 of the battery cell support 7 from which the lead wire 31 of the temperature sensor 3 extends.

As shown in FIG. 4A and FIG. 5, in the moving direction of the temperature sensor 3 relative to the battery cell support 7 when the temperature sensor 3 is installed in the battery cell support 7, the temperature sensor guide section 11 is formed at both ends of the concave portion 39 constituting the temperature sensor installation section 9 in the vertical direction of FIG. 4A.

When seen in the above moving direction, the temperature sensor guide section 11 includes a small rectangular convex portion 41 protruding from the flat portion 37 of the battery cell support 7 toward the concave portion 39 forming the temperature sensor installation section 9. The convex portion 41 is positioned at the center of the flat portion 37 of the battery cell support 7 in the thickness direction (lateral direction in FIG. 4A).

When seen in above the moving direction, the temperature sensor guided section 15 includes a small rectangular concave portion 43 formed at both ends of the temperature sensor body 29. The concave portion 43 is positioned at the center of the temperature sensor body 29 in the thickness direction.

In the installation structure of the installed temperature sensor 1, each of the pair of convex portions 41 constituting the temperature sensor guide section 11 is fitted into each of the pair of concave portions 43 constituting the temperature sensor guided section 15.

Meanwhile, the temperature sensor guide section 11 may include concave portions, and the temperature sensor guided section 15 may include convex portions. Further, the temperature sensor guide section 11 and the temperature sensor guided section 15 may include concave portions and convex portions having a shape other than a rectangle such as a triangular shape.

As shown in FIGS. 1 and 4A, a plurality of battery cells 5 (5A and 5B) are provided in the lateral direction. The temperature sensor (e.g., one temperature sensor) 3A is configured to measure temperatures of two battery cells 5 that are laterally adjacent to each other. The temperature sensor 3A is disposed between two battery cells 5 (5A and 5B), which are laterally adjacent, to each other, among the plurality of battery cells 5 disposed in the battery cell support 7.

The relationship between the two battery cells 5 (5A and 5B) adjacent to each other, the flat portion 37 of the battery cell support 7, and the temperature sensor 3 will now be described. The battery cell body 33 is formed into a rectangular flat shape. The battery cell bodies 33 of the two battery cells 5 (5A and 5B) adjacent to each other have the thickness directions coinciding with each other. The two battery cells 5 adjacent to each other are separated by a predetermined distance in the thickness directions of the battery cell bodies 33. When the two battery cells 5 (5A and 5B) adjacent to each other are seen in the thickness directions of the battery cell bodies 33, the enter first battery cell body 33 and the entire second battery cell body part 33 overlap with each other.

The thickness direction of the flat portion 37 of the battery cell support 7 and the thickness direction of the battery cell body 33 coincide with each other. Further, the flat portion 37 and the temperature sensor body section 29 that is installed in the convex portion 39 constituting the temperature sensor installation section 9 are provided between the two battery cells 5 (5A and 5B) adjacent to each other. The temperature sensor 3A measures the temperatures of the two battery cells 5 (5A and 5B) adjacent to each other.

Figure 8:
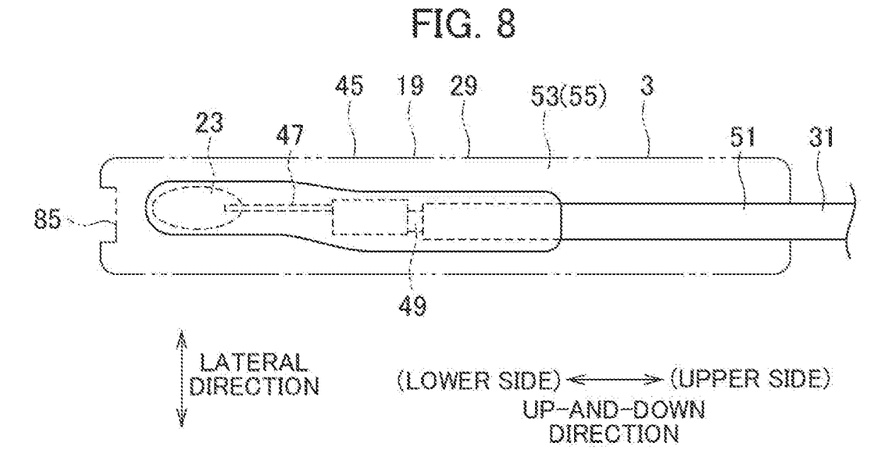
FIG. 8 is a diagram of the temperature sensor according to the present embodiment seen from a predetermined direction (vertical direction).

As shown in FIG. 8 and the like, the temperature sensor 3 includes the temperature sensor body 29 and the lead wire 31. The temperature sensor body 29 includes a temperature sensor housing 45, a temperature detection element 23, and a connection conductor 47.

The temperature sensor housing 45 includes an outer surface (a heat source surface; a heat receiving surface of the battery cell) 19 which is one predetermined plane of the temperature sensor 3. The lead wire 31 includes a pair of core wires 49 formed of conductors, and a coating 51 covering each of the pair of core wires 49.

In the lead wire 31, a first end portion, which is one end in the longitudinal direction, enters the temperature sensor housing 45. In addition, in the first end portion entering the temperature sensor housing 45, the pair of core wires 49 is parallel to each other (see FIG. 9C and the like) and extends by a predetermined length linearly in the up-and-down direction in parallel with the plane 19 of the temperature sensor housing 45.

The temperature detection element 23 is installed in the temperature sensor housing 45 away from the first end of the lead wire 31 (core wire 49) in the extending direction of the pair of core wires 49.

Figure 9A:
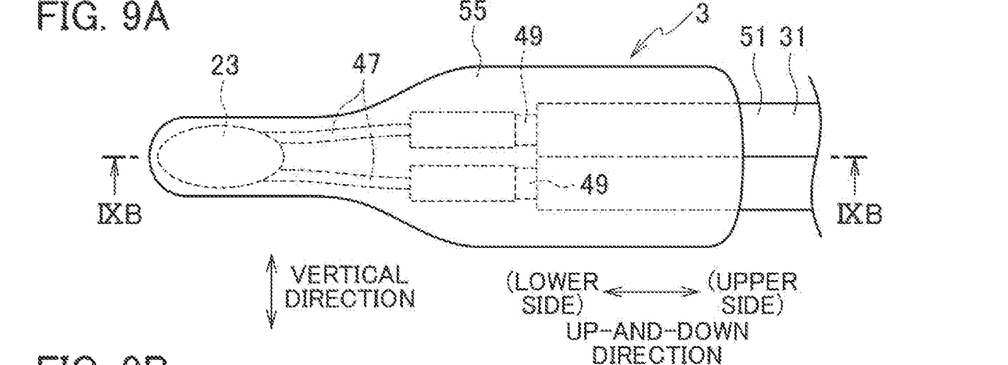
FIG. 9A is a diagram of an internal structure of the temperature sensor according to the present embodiment seen from a predetermined direction (lateral direction).
Figure 9B:
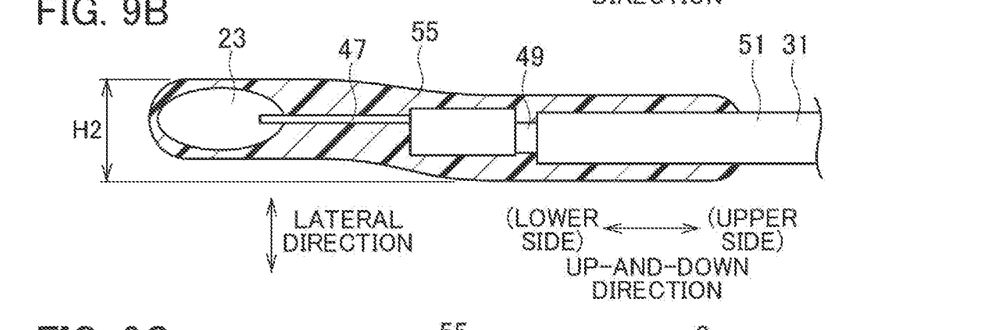
FIG. 9B is a sectional view taken along a line IXB-IXB in FIG. 9A.
Figure 9C:
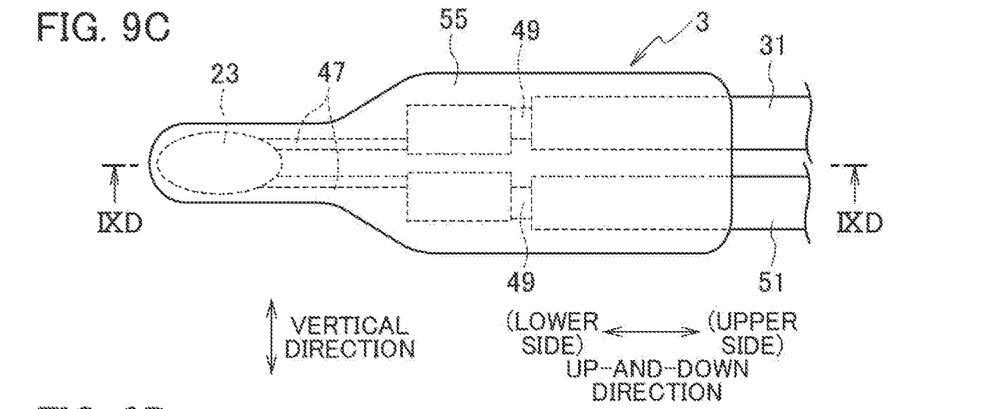
FIG. 9C is a diagram of an internal structure of another temperature sensor according to the present embodiment seen from a predetermined direction (lateral direction).

As shown in FIG. 9C or the like, the connection conductor 47 is formed into an elongated rod shape, and has a value of the outer diameter smaller than a value of the outer diameter of the core wire 49. The connection conductor 47 extends by a predetermined length in the temperature sensor housing 45 in a straight line in the same direction as the core wire 49 of the lead wire 31. The connection conductor 47 and the core wire 49 of the lead wire 31 are parallel to each other. The connection conductor 47 is provided as a pair, and connects each of the pair of core wires 49 of the lead wire 31 to the temperature detection element 23.

In the temperature sensor 3, the pair of core wires 49 in the first end portion of the lead wire 31, the pair of connection conductors 47, and the temperature detection element 23 are arranged in the up-and-down direction along the plane 19 of the temperature sensor housing 45 in the vicinity of the plane 19 of the temperature sensor housing 45.

Figure 9D:
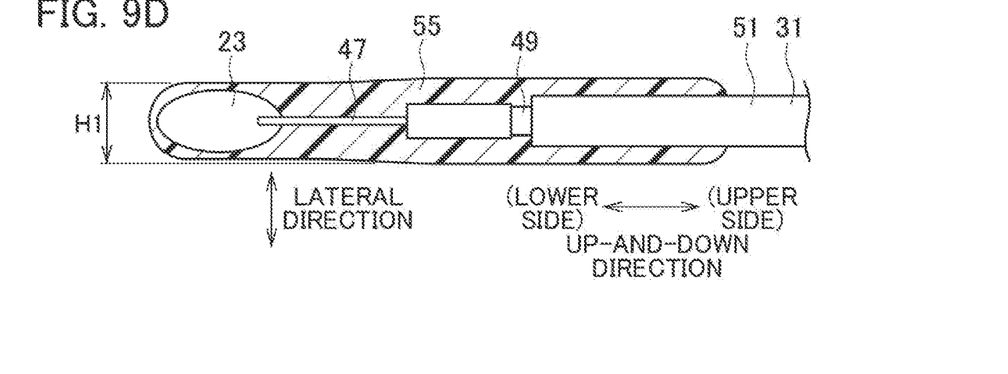
FIG. 9D is a sectional view taken along a line IXD-IXD in FIG. 9C.

The temperature sensor 3 has a structure as shown in FIG. 9D when seen in a direction indicating a distance between the pair of connection conductors 47 parallel to each other.

In FIG. 9D, a center axis of the core wire 49 in the first end portion of the lead wire 31 and a center axis of the connection conductor 47 coincide with each other and pass through a center of the temperature detection element 23. That is, the center axis of the core wire 49 and the center axis of the connection conductor 47 coincide with the center axis of the temperature detection element 23.

The direction indicating the distance between the pair of connection conductors 47 parallel to each other is a direction in which the pair of connection conductors 47 parallel to each other perfectly overlap with each other, and is, for example, a direction orthogonal to the extending direction of the connection conductor 47, and corresponds to the vertical direction in FIG. 9A.

When seen in a direction (for example, a direction perpendicular to the extending direction of the connection conductor 47 and the lateral direction in FIG. 9D) orthogonal to the direction indicating the distance between the pair of connection conductors 47 parallel to each other, a center of the temperature detection element 23 is positioned between the pair of connection conductors 47 and in the center of the pair of connection conductors 47 (see FIG. 9C).

When seen in a direction orthogonal to the direction indicating the distance between the pair of connection conductors 47 parallel to each other, the center axis of the connection conductor 47 is separated from the center axis of the core wire 49 of the lead wire 31 (see FIG. 9C).

When seen in a direction orthogonal to the direction indicating the distance between the pair of connection conductors 47 parallel to each other, the pair of connection conductors 47 is disposed inside the pair of core wires 49 in the direction indicating the distance between the pair of connection conductors 47 parallel to each other (see FIG. 9C).

The temperature detection element 23 is formed into, for example, a spheroid (long sphere). The spheroid is a three-dimensional shape represented by a locus of an ellipse when the ellipse rotates by 180° about a major axis of the ellipse. The major axis is the center axis of the temperature detection element 23.

As shown in FIGS. 6A and 8, the temperature sensor housing 45 is formed of, for example, a synthetic resin having a high thermal conductivity and has a rectangular square shape. An outer surface of the temperature sensor housing 45 is an outer surface of the temperature sensor body 29 except an opening of a concave portion 53 of the square (inside the square). The temperature detection element 23 and the connection conductor 47 are disposed in the concave portion 53 of the square of the temperature sensor housing 45 while a first end portion, which one end in the longitudinal direction of the lead wire 31, enters the concave portion 53.

The pair of core wires 49 of the lead wire 31, the connection conductors 47, and the temperature detection element 23 are arranged in this order in the direction from the opening toward the bottom of the concave portion 53 of the temperature sensor housing 45 (a direction from the right toward the left in FIG. 8, and a direction from the upper side toward the lower side in the up-and-down direction). The lead wire 31 extends from the opening of the concave portion 53 of the temperature sensor housing 45. The extending directions of the core wire 49 and the connection conductor 47 coincide with the direction from the opening toward the bottom of the concave portion 53 of the temperature sensor housing 45.

The concave portion 53 of the temperature sensor housing 45 is filled with an insulating material 55 such as a resin having a high thermal conductivity. That is, the space between the inner wall of the temperature sensor housing 45, and the lead wire 31, the connection conductor 47 and the temperature detection element 23 is filled with the insulating material 55 such as resin.

The installation structure of the temperature sensor 1 will now be described in more detail.

As described above, the battery cell body 33 of the battery cell 5 is formed into a rectangular flat shape (rectangular parallelepiped shape) and has a lateral thickness direction. A dimension value of the battery cell body 33 in the up-and-down direction is larger than a dimension value of the battery cell body 33 in the lateral direction. A dimension value of the battery cell body 33 in the vertical direction is larger than the dimension value of the battery cell body 33 in the vertical direction. The battery cell terminals 35 protrude from the upper surface of the battery cell body 33.

Five rectangular planar outer surfaces of the battery cell body 33 are used as the plane 17 of the battery cell 5 which is parallel to and faces the predetermined plane 19 of the temperature sensor 3 with the material 21 having thermal conductivity in between. These five rectangular planar outer surfaces are the planes among six rectangular planes of the rectangular parallelepiped battery cell body 33 except for the plane from which the battery cell terminal 35 protrudes. The upper surface from which the battery cell terminal 35 protrudes may be opposed to the predetermined plane 19 of the temperature sensor 3.

As shown in FIGS. 1 to 3, the battery cell support 7 is formed by joining a plurality of segments 57. Each of the segments 57 is formed to have substantially the same shape. The segment 57 includes a first portion 59, a second portion 61, a third portion 63, and a fourth portion 65.

The first portion 59 is formed into a rectangular flat shape and has a lateral thickness direction. The second portion 61 is formed into a square columnar shape (a rectangular plate shape having a narrow width), and the third portion 63 is formed into the same shape as the second portion 61.

The second portion 61 is joined to the first portion 59 at one end (first end) of the first portion 59 in the vertical direction, and the third portion 63 is joined to the first portion 59 at the other end (second end) of the first portion 59 in the vertical direction. The second portion 61 and the third portion 63 are joined to the first portion 59 over the entire length in the up-and-down direction. When seen in the up-and-down direction, the first portion 59, the second portion 61, and the third portion 63 appear in an "I" shape or an "H" shape.

The fourth portion 65 is provided at the lower end of the first portion 59, and the temperature sensor installation section 9 is formed by the fourth portion 65.

The temperature sensor installation section 9 is formed in the first portion 59. The temperature sensor installation section 9 is also formed in the second portion 61 or the third portion 63. The temperature sensor 3A is installed in the first portion 59, the temperature sensor 3B is installed in the second portion 61, and the temperature sensor 3C is installed in the fourth portion 65.

The temperature sensor 3A is disposed in the first portion 59 of one segment 57. The temperature sensor 3B is disposed in the second portion 61 of two segments 57 adjacent to each other. In other words, by joining and assembling the two segments 57 adjacent to each other, the installation section 9 for installing the temperature sensor 3B is formed. Similar to the temperature sensor 3B, the temperature sensor 3C is disposed in the fourth portion 65 of the two segments 57 adjacent to each other.

The respective segments 57 are assembled such that the thickness directions of the first portions 59 of the respective segments 57 coincide with each other, the ends of the second portions 61 of the respective segments 57 are joined with each other and the ends of the third portions 63 of the respective segments 57 are joined with each other. By being assembled in this way, the two segments 57 adjacent to each other form a rectangular plate-like battery cell housing space 67 in which one battery cell 5 is housed.

The battery cell housing space 67 has an upper end and a lower end open. Since the upper end of the battery cell housing space 67 is entirely open, the battery cell 5 may be housed in the battery cell housing space 67 from the opening of the upper end of the battery cell housing space 67. In addition, the battery cell 5 housed in the battery cell housing space 67 may be removed from the opening of the upper end of the battery cell housing space 67.

The opening of the lower end of the battery cell housing space 67 is partially closed by the fourth portion 65. Thus, the fourth portion 65 also functions as a stopper (for preventing the battery cell 5 from falling, for example) of the battery cell 5 housed in the battery cell housing space 67.

In a state where the battery cell 5 is installed in the battery cell housing space 67, a part of the inner wall of the battery cell housing space 67 and a part of the outer surface of the battery cell body 33 are in contact with each other. Thus, the battery cell 5 and the battery cell support 7 are integrated.

Further, by assembling and joining the n number of segments 57, the n−1 number of battery cell housing spaces 67 are formed.

As shown in FIG. 7, the first portion 59 having a large area of the segment 57 includes a metal rectangular flat portion (cooling plate) 69 having a higher thermal conductivity, and a synthetic resin rectangular flat portion 71. The battery cell 5 is cooled mainly through the metal rectangular flat portion 69. The temperature sensor installation section 9 of the first portion 59 is formed in the synthetic resin rectangular flat portion 71. The second portion 61 and the third portion 63 of the segment 57 may be configured similarly to the first portion 59.

As shown in FIG. 7, the metal rectangular flat portion 69 having a high thermal conductivity and the synthetic resin rectangular flat portion 71 are joined to each other by fitting a convex portion 73 of the metal rectangular flat portion 69 into a concave portion 75 of the synthetic resin rectangular flat portion 71.

The convex portion 73 of the metal rectangular flat portion 69 is formed in the same manner as the convex portion 41 of the temperature sensor guide section 11, and is provided at the end of the metal rectangular flat portion 69. The concave portion 75 of the synthetic resin rectangular flat portion 71 is formed in the same manner as the concave portion 43 of the temperature sensor guided section 15, and is provided at the end of the synthetic resin rectangular flat portion 71.

As shown in FIGS. 5 and 6A, the locked section 27 of the temperature sensor 3 includes a pair of convex portions 77 and a pair of concave portions 79 provided at both ends of the temperature sensor housing 45 in the vertical direction (width direction). The convex portion 77 is adjacent to the concave portion 43 constituting the temperature sensor guided section 15 in the up-and-down direction (the direction of insertion into the temperature sensor installation section 9 when the temperature sensor 3 is installed). Further, the convex portion 77 is positioned at an end on the lead wire 31 side in the up-and-down direction.

The concave portion 79 is adjacent to the convex portion 77 in the up-and-down direction, and is positioned closer to the lead wire 31 than the convex portion 77. Note that when the convex portion 77 is not provided, the concave portion 43 constituting the temperature sensor guided section 15 is connected to the concave portion 79, and the connected concave portion is continuously provided in the temperature sensor housing 45 over the entire length in the up-and-down direction.

As shown in FIGS. 5, 6A, and 6B, the locking section 25 of the battery cell support 7 includes a pair of convex portions 81 provided at both ends of the rectangular parallelepiped concave portion 39 constituting the temperature sensor installation section 9 in the vertical direction (width direction). That is, the convex portion 41 constituting the temperature sensor guide section 11 is not provided in the opening side portion of the rectangular parallelepiped concave portion 39 constituting the temperature sensor installation section 9, and the convex portion 81 is provided away from the convex portion 41 in the portion where the convex portion 41 is not provided.

In the final stage when the temperature sensor 3 is installed in the battery cell support 7, the convex portion 77 abuts on the convex portion 81, and, for example, the convex portion 77 and the convex portion 81 are elastically deformed. When the temperature sensor 3 is completely installed in the battery cell support 7, as shown in FIGS. 6A and 6B, the convex portions 77 and 81 are restored, and the convex portion 77 is sandwiched between the convex portions 41 and 81. Thus, the locked section 27 is locked to the locking section 25 to thereby prevent the temperature sensor 3 from coming off the battery cell support 7.

A convex portion 83 similar to the convex portion 41 of the temperature sensor guide section 11 is provided at the bottom of the rectangular parallelepiped concave portion 39 of the temperature sensor installation section 9. A distal end portion (a portion opposed to the lead wire 31) of the temperature sensor housing 45 is provided with a concave portion 85 similar to the concave portion 43 of the temperature sensor guided section 15. In a state where the temperature sensor 3 is installed in the battery cell support 7, the convex portion 83 is fitted into the concave portion 85.

The assembling procedure of the installation structure of the temperature sensor 1 will now be described.

Firstly, the plurality of segments 57 are assembled to obtain the battery cell support 7. Next, the battery cell 5 is installed in the battery cell support 7. Subsequently, the temperature sensor 3 is installed in the battery cell support 7.

In the above procedure, the step of installing the battery cell 5 in the battery cell support 7 may be replaced with the step of installing the temperature sensor 3 in the battery cell support 7.

In FIG. 1, the temperature sensor 3A detects temperatures of the battery cell 5A and the battery cell 5B. The temperature sensor 3B detects a temperature of the battery cell 5A. The temperature sensor 3C detects the temperature of the battery cell 5A.

The installation structure of the temperature sensor 1 according to the present embodiment includes the battery cell support 7 provided with the installation section 9, the guide section 11, and the battery cell installation section 13 for supporting the battery cell 5. In the installation structure of the temperature sensor 1, the guided section 15 engaged with the guide section 11 of the battery cell 5 is provided, and the temperature sensor 3 is moved relative to the battery cell support 7 along the battery cell 5 while engaging the guided section 15 with the guide section 11. By this movement, the temperature sensor 3 is installed in the installation section 9 of the battery cell support 7.

Thus, the installation structure of the temperature sensor 1 employs a fitting structure of the battery cell support 7 with the temperature sensor 3 using a rail. In addition, a degree of freedom of the installation mode of the temperature sensor 3 may be increased. That is, an installation space of the temperature sensor 3 is reduced by using the rail as the fitting structure. The temperature sensor 3 (3A and 3C) may also be mounted between the battery cells 5 (between 5A and 5B) and on the lower surface of the battery cell 5, which have not been able to conventionally be mounted (installed).

That is, since the degree of freedom of the mounting position of the temperature sensor 3 is increased, the temperature sensor 3 may be mounted in a position where the temperature sensor 3 cannot be mounted in a conventional shape. Further, since an installation space of the temperature sensor 3 is reduced, this makes it possible to cope with the miniaturization of the battery cell 5. That is, even if the battery cell 5 becomes small, the installation space of the temperature sensor 3 becomes small, so that the temperature sensor 3 may be installed in the smaller battery cell 5.

Next, a comparative example will be described. In the installation structure of the temperature sensor according to the comparative example, a free end of a locking arm extending from a sensor body of the temperature sensor is attached to a measured section in a mode of receiving a pressing load relative to the measured section side. An elastic restoring force of the locking arm secures a close contact between a temperature measuring surface at a distal end of the sensor body and the measured section. In the temperature sensor according to the comparative example, the locking arm is provided in a flexible member extended elastically and displaceably to the sensor body.

Therefore, in the installation structure of the temperature sensor according to the comparative example, a space required for installing the temperature sensor is large, so that there are fewer options for a mounting position (installation mode) of the temperature sensor.

In the installation structure of the temperature sensor 1 according to the embodiment, when the temperature sensor 3 is moved relative to the battery cell support 7, the locked section 27 is separated from the locking section 25 in the first stage and the middle stage of the movement. Further, when the movement is completed, the locked section 27 is locked to the locking section 25. Thus, the temperature sensor 3 may be smoothly moved relative to the battery cell support 7, and the temperature sensor 3 may be easily installed in the battery cell support 7.

Further, in the installation structure of the temperature sensor 1, the temperature sensor 3A is installed between two battery cells 5 (5A and 5B) adjacent to each other, and the temperatures of the two battery cells 5 (5A and 5B) are measured together. Thus, the number of the temperature sensors 3 may be reduced, thereby making it possible to simplify the configuration of the installation structure of the temperature sensor 1.

In the temperature sensor 3, the pair of core wires 49 in the first end portion of the lead wire 31, the pair of the connection conductors 47, and the temperature detection element 23 are arranged along the plane 19 of the temperature sensor housing 45 in the vicinity of the plane 19 of the temperature sensor housing 45, so that a temperature measuring performance is enhanced.

That is, in the temperature sensor 3, heat is collected on the plane 19 of the temperature sensor housing 45, and the collected heat is immediately transmitted to the temperature detection element 23, so that the responsiveness of temperature detection to a temperature rise is improved. In addition, the temperature sensor 3 may receive radiant heat from the battery cell 5 on the plane 19 of the temperature sensor housing 45, thereby improving the responsiveness of temperature detection to a temperature rise.

In the temperature sensor according to the comparative example, the temperature detecting element is positioned away from the heat source. Therefore, in order to satisfy a temperature measuring performance, a heat collecting plate is required, so that the number of components is increased, which is costly.

In contrast, in the temperature sensor 3 according to the embodiment, even if there is no heat collecting plate, the configuration described above makes it possible to enhance the temperature measuring performance.

In the temperature sensor 3, as shown in FIGS. 9C and 9D, the temperature detection element 23 and the core wire 49 of the lead wire 31 are connected in parallel. Therefore, a height of the temperature sensor 3 may be reduced in comparison with the case where the temperature detection element 23 and the core wire 49 of the lead wire 31 are connected in overlapping manner shown in FIGS. 9A and 9B.

That is, a value of the dimension H1 shown in FIG. 9D is smaller than a value of the dimension H2 shown in FIG. 9B. As a result, the height of the temperature sensor 3 shown in FIGS. 9C and 9D is lower than that of the temperature sensor 3 shown in FIGS. 9A and 9B, thereby improving the temperature measuring performance.

Further, the temperature sensor 3 does not require a heat collecting plate provided in the temperature sensor according to the comparative example, so that the number of components may be reduced, thereby making it possible to reduce the cost. Further, the temperature sensor 3 may be used at a place where the mounting space is limited due to the low height.

When the temperature sensor 3 shown in FIGS. 9C and 9D is seen in the direction indicating the distance between the pair of connection conductors 47 parallel to each other, a center axis of the core wire 49 in the first end portion of the lead wire 31 and a center axis of the connection conductor 47 coincide with each other. Further, when the temperature sensor 3 shown in FIGS. 9C and 9D is seen in the direction indicating the distance between the pair of connection conductors 47 parallel to each other, the center axis of the connection conductor 47 passes through the center of the temperature detection element 23, thereby making it possible to further reduce the height of the temperature sensor 3.

Here, the temperature sensor 3 shown in FIGS. 9A and 9B will be described in detail.

When the temperature sensor 3 shown in FIGS. 9A and 9B is seen in the direction orthogonal to the direction indicating the distance between the pair of connection conductors 47 parallel to each other, as shown in FIG. 9B, the respective center axes of the pair of core wires 49 and the respective center axes of the pair of connection conductors 47 coincide with each other.

In the temperature sensor 3 shown in FIG. 9A, the center of the temperature detection element 23 is positioned between the pair of connection conductors 47 and in the center of the pair of connection conductors 47. When the temperature sensor 3 shown in FIGS. 9A and 9B is seen in the direction indicating the distance between the pair of connection conductors 47 parallel to each other, as shown in FIG. 9B, the center axis of the connection conductor 47 passes through the center of the temperature detecting element 23. Further, in the temperature sensor 3 shown in FIG. 9B, the center axis of the connection conductor 47 is separated from the center axis of the core wire 49.

In the installation structure of the temperature sensor 1, the temperature sensor 3 shown in FIGS. 9A and 9B or the temperature sensor 3 shown in FIGS. 9C, 9D and 8 may be employed. However, it is preferable that the temperature sensor 3 shown in FIGS. 9C and 9D may be employed as the temperature sensor 3A shown in FIG. 1, and the temperature sensor 3 shown in FIGS. 9A, 9B and 8 may be employed as the temperature sensors 3B and 3C shown in FIG. 1.

In the temperature sensors 3B and 3C, for example, the upper surface (a surface on the temperature detection element 23 side) of the temperature sensor housing 45 of the temperature sensor 3 shown in FIG. 8 is positioned on the battery cell 5 side, and the lower surface of the temperature sensor housing 45 is positioned on the opposition side of the battery cell 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An installation structure of a temperature sensor comprising:
   a measured object support provided with an installation section, a guide section, and a measured object support section that supports a measured object; and
   a temperature sensor provided with a guided section engaged with the guide section of the measured object support, and installed in the installation section of the measured object support by moving in a predetermined direction relative to the measured object support in a manner along one predetermined outer surface of the measured object while engaging the guided section with the guide section, wherein
   a plurality of measured objects are provided, and
   the temperature sensor, which is installed between the plurality of measured objects adjacent to each other among the plurality of measured objects installed in the measured object support, is configured to measure temperatures of two measured objects adjacent to each other.

2. The installation structure of the temperature sensor according to claim 1, wherein
   the measured object support is provided with a locking section,
   the temperature sensor is provided with a locked section, and
   in order to install the temperature sensor in the installation section of the measured object support, when the temperature sensor is moved relative to the measured object support in the predetermined direction, the locked section is separated from the locking section in a first stage and a middle stage of the movement, and when the movement is completed, the locked section is locked to the locking section, so that the temperature sensor is installed in the measured object support.

3. The installation structure of the temperature sensor according to claim 1, wherein the temperature sensor includes:
- a temperature sensor housing having a planar outer surface;
- a lead wire in which a first end portion, which is one end in a longitudinal direction, enters the temperature sensor housing, and in the first end portion, a pair of core wires extending in parallel with the planar outer surface of the temperature sensor housing;
- a temperature detection element installed in the temperature sensor housing away from the first end of the lead wire; and
- a pair of connection conductors formed into an elongated rod shape extends in the temperature sensor housing in the same direction as the pair of core wires of the lead wire, and connecting each of the pair of core wires of the lead wire to the temperature detection element, wherein
- the temperature sensor is configured such that the pair of core wires in the first end portion of the lead wire, the pair of connection conductors, and the temperature detection element are arranged along the planar outer surface of the temperature sensor housing in a vicinity of the planar outer surface of the temperature sensor housing.

* * * * *